United States Patent
Hwang et al.

(10) Patent No.: US 8,457,695 B2
(45) Date of Patent: Jun. 4, 2013

(54) MOBILE COMMUNICATION TERMINAL HAVING FRAGRANCE MEMBER

(75) Inventors: Chang Youn Hwang, Hwaseong-si (KR); Young Ki Kim, Yongin-si (KR); Shin Chul Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 752 days.

(21) Appl. No.: 12/244,537

(22) Filed: Oct. 2, 2008

(65) Prior Publication Data
US 2009/0093282 A1  Apr. 9, 2009

(30) Foreign Application Priority Data

Oct. 5, 2007 (KR) .................. 10-2007-0100205

(51) Int. Cl.
*H04M 1/00* (2006.01)

(52) U.S. Cl.
USPC .............. 455/575.1; 455/575.3; 455/575.4; 455/575.8

(58) Field of Classification Search
USPC  . 455/575.1, 575.3, 575.4, 575.8, 899; 442/96
See application file for complete search history.

(56) References Cited

U.S. PATENT DOCUMENTS

| | | | |
|---|---|---|---|
| 6,425,530 B1 * | 7/2002 | Coakley | 239/52 |
| 7,512,415 B2 * | 3/2009 | Fazzio et al. | 455/556.1 |
| 7,877,118 B2 * | 1/2011 | Park | 455/575.1 |
| 8,238,970 B2 * | 8/2012 | Seo et al. | 455/556.1 |
| 2004/0198417 A1 * | 10/2004 | Yoda | 455/550.1 |
| 2004/0203412 A1 * | 10/2004 | Greco et al. | 455/66.1 |
| 2004/0204043 A1 * | 10/2004 | Wang et al. | 455/556.1 |
| 2004/0235430 A1 * | 11/2004 | Ma et al. | 455/90.1 |
| 2005/0094025 A1 * | 5/2005 | Yoon | 348/360 |
| 2006/0251348 A1 * | 11/2006 | Egami et al. | 384/58 |
| 2007/0090550 A1 * | 4/2007 | Manne | 261/104 |
| 2009/0054116 A1 * | 2/2009 | Hakunti et al. | 455/899 |
| 2009/0261181 A1 * | 10/2009 | Cheung | 239/129 |
| 2011/0226864 A1 * | 9/2011 | Kim et al. | 239/6 |

FOREIGN PATENT DOCUMENTS

JP    57186896 A * 11/1982
KR   2006012913 A *  2/2006

OTHER PUBLICATIONS

Unofficial Translation of Korean Patent Application Publication # KR200601291A.*

* cited by examiner

*Primary Examiner* — Allahyar Kasraian
(74) *Attorney, Agent, or Firm* — H.C. Park & Associates, PLC

(57) ABSTRACT

A mobile communication terminal includes a fixed body, and a movable body coupled with the fixed body. At least one of the fixed body and the movable body has a fragrance member at a portion thereof that generates friction when the movable body moves.

18 Claims, 3 Drawing Sheets

MOBILE COMMUNICATION TERMINAL HAVING FRAGRANCE MEMBER

CROSS REFERENCE TO THE RELATED APPLICATION

This application claims priority from and the benefit of Korean Patent Application No. 10-2007-0100205, filed on Oct. 5, 2007, which is hereby incorporated by reference for all purposes as if fully set forth herein.

BACKGROUND OF THE INVENTION

1. Field of the Invention

The present invention relates generally to a mobile communication terminal and, more particularly, to a mobile communication terminal having a fragrance member capable of continuously emitting fragrance.

2. Discussion of the Background

In general, mobile communication terminals refer to terminals, such as personal mobile communication service terminals, personal digital assistants (PDAs), smart phones, international mobile telecommunication 2000 (IMT-2000) terminals, and wireless local area network (LAN) terminals, which enable mobile communication and various other functions using application programs while users are carrying them.

Due to new developments, mobile communication terminals are becoming smaller and lighter and may be capable of performing various functions such as those of mp3 players, digital cameras, navigators, and the Internet. Accordingly, mobile communication terminals are becoming complex communication terminals and modern necessities.

In addition, various methods for providing fragrance to mobile communication terminals are being developed. For example, methods in which aromatic plastic cards or vessels to jet aromatic liquid are mounted to mobile communication terminals, which then emit fragrance under the control of users, have been developed.

However, such methods cannot maintain a fragrance for a long time. In other words, in the case of plastic cards, the fragrance may disappear from the plastic cards over time. In addition, in the case of an aromatic liquid, once all of the aromatic liquid filled in the vessel is used, the vessel must be refilled.

In order to solve these problems, methods of periodically exchanging or refilling aromatics (for example, aromatic plastic cards or aromatic liquid) are being used. However, the users may need to directly exchange aromatics whenever necessary, and these methods may make such exchanges very inconvenient and costly.

SUMMARY OF THE INVENTION

The present invention provides a mobile communication terminal having a fragrance member capable of continuously emitting fragrance without a separate manipulation thereof or exchange of an aromatic.

Additional features of the invention will be set forth in the description which follows, and in part will be apparent from the description, or may be learned by practice of the invention.

The present invention discloses a slide type mobile communication terminal including a fragrance member, a fixed body, and a movable body slidably connected to the fixed body. The fragrance member is disposed at a portion of at least one of the fixed body and the movable body that generates friction between the fixed body and the movable body when the movable body slides.

The present invention also discloses a folder type mobile communication terminal including a fragrance member, a fixed body, a hinge module engaged with a first end of the fixed body, and a rotatable body. A first end of the rotatable body is connected to the hinge module and the rotatable body is rotatable about the hinge module. The fragrance member is disposed at a portion of the hinge module where friction is generated when the rotatable body rotates.

The present invention also discloses a mobile communication terminal including a fragrance member, a fixed body, and a movable body coupled with the fixed body. The fragrance member is disposed at a portion of at least one of the fixed body and the movable body that generates friction when the movable body slides.

The present invention also discloses a method of manufacturing a fragrance member of a mobile communication terminal. The method includes mixing a synthetic resin and an aromatic to form a mixture, melting the mixture, and performing injection molding with the melted mixture.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
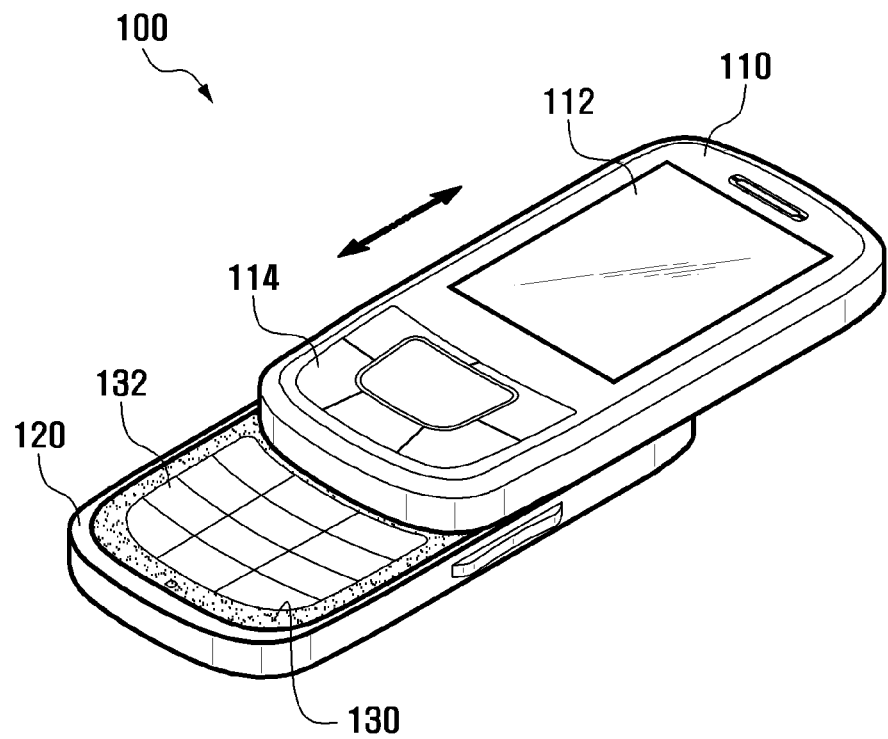
FIG. 1 is a perspective view schematically showing the structure of a mobile communication terminal having a fragrance member according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention will be described in detail with reference to the accompanying drawings.

Figure 2:
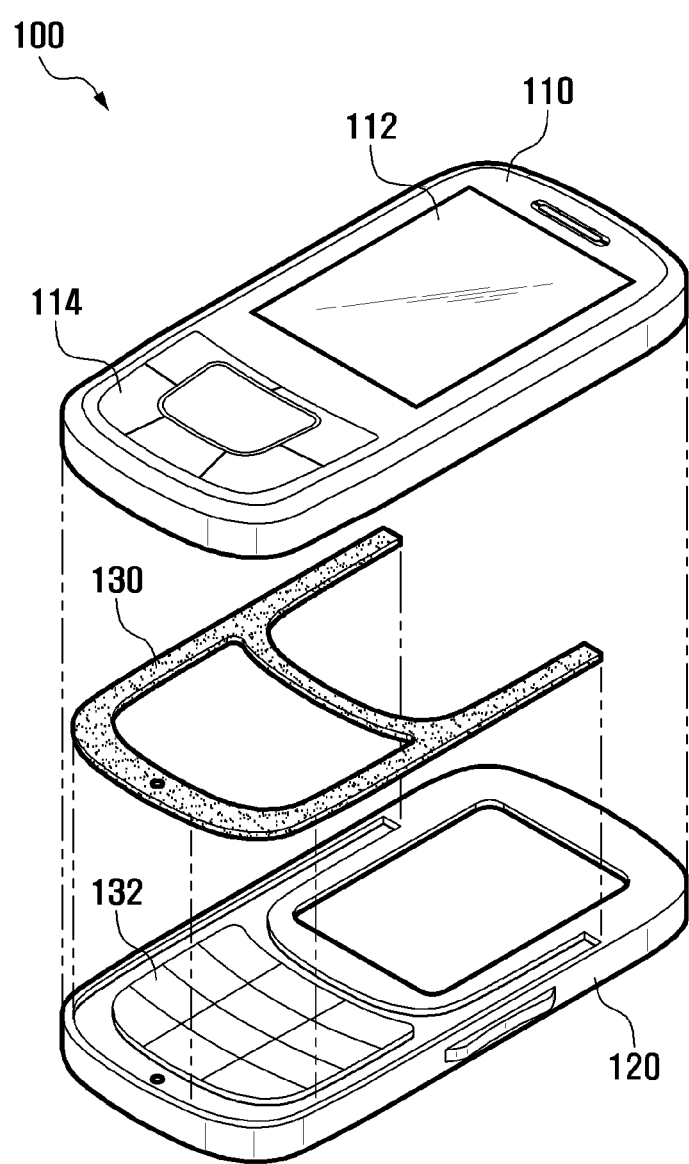
FIG. 2 is an exploded perspective view of FIG. 1.

FIG. 1 is a perspective view schematically showing the structure of a mobile communication terminal having a fragrance member according to an exemplary embodiment of the present invention, and FIG. 2 is an exploded perspective view of FIG. 1.

Referring to FIG. 1 and FIG. 2, the mobile communication terminal 100 according to the exemplary embodiment of the present invention is a slide type mobile communication terminal 100 that includes a fixed body 120 and a movable body 110.

A display 112 and a plurality of control keys 114 are provided on the upper surface of the movable body 110.

The display 112 visually provides the user with menus of the mobile communication terminal 100, user data input by the user, function setting information, and various other information. The display 112 may be a liquid crystal display (LCD). In this case, the display 112 includes a liquid crystal panel and a backlight assembly. The liquid crystal panel displays an image by controlling the optical transmission rates of liquid crystal cells injected between two glass substrates. The liquid crystal cells control the amount of light that is transmitted in response to video signals, i.e. pixel signals. The backlight assembly emits light to the liquid crystal panel, thereby enabling the user to recognize a screen through the light transmitted through the liquid crystal panel.

The control keys 114 enable the user to input control signals to control the mobile communication terminal 100. As a result, the user may control and use various functions of the mobile communication terminal 100.

The movable body 110 is connected to the fixed body 120 and slides on the fixed body 120 in response to user manipulation of the movable body 110.

A keypad 132 to input numbers and letters is disposed on the upper surface of the fixed body 120, and the upper surface of the fixed body 120 is connected to the lower surface of the movable body 110. The movable body 110 is engaged with the fixed body 120 so that it can slide on the fixed body 120.

The fixed body 120 includes a friction member 130 that functions as a fragrance member. The friction member 130 is attached to an upper portion of the fixed body 120 that contacts the movable body 110. The friction member 130 surrounds the keypad 132 of the fixed body 120. Accordingly, when the movable body 110 is moved on the fixed body 120, the lower surface of the movable body 110 (in particular, a portion of the movable body 110 that faces the friction member 130) contacts the friction member 130 of the fixed body 120.

The friction member 130 is a fragrance member that emits fragrance, and is formed by mixing a synthetic resin with an aromatic. The synthetic resin used in the friction member 130 may be polyacetal (POM) because polyacetal may be injection-molded at a low temperature, but the present invention is not limited thereto.

More particularly, the decomposition temperatures of aromatics are generally 200 to 220 degrees Celsius. Accordingly, when the melting temperature during the injection molding process exceeds these temperatures, aromatics may lose their original functions. For this reason, in this exemplary embodiment of the present invention, polyacetal that can be injection-molded at a low temperature is used as the synthetic resin. Since injection molding of polyacetal is possible below 200 degrees Celsius, an aromatic may be contained in the friction member 130 without losing its original function.

The friction member 130 may be formed by mixing 3 to 7 wt. % (for example, approximately 5 wt. %) of an aromatic with polyacetal. If the friction member contains more than 7 wt. % of the aromatic, the aromatic properties of the friction member 130 may be changed due to excessive mixing of the aromatic. If the friction member 130 contains less than 3 wt. % of the aromatic, a user may not be able to smell the fragrance. The friction member 130 may be formed by melting polyacetal and the aromatic to make a frictional material and then injection molding the frictional material. In the exemplary embodiment of the present invention, the friction member 130 may be injection-molded at a temperature of 200 degrees Celsius or less. More specifically, the friction member 130 may be melted and injection-molded at a temperature of 170 to 200 degrees Celsius.

The operation of the mobile communication terminal according to the exemplary embodiment of the present invention is as follows.

The user slides and moves the movable body 110 to use the mobile communication terminal 100. During the process, the user may press the movable body 110 with his/her thumb in order to push the movable body 110 up. Accordingly, the lower surface of the movable body 110 (in particular, a portion of the movable body 110 that faces the friction member 130) contacts the friction member 130 attached to the fixed body 120. Thereafter, if the user pushes the movable body 110 up, the movable body 110 may slide and move upward. Then, the contact portions of the movable body 110 and the friction member 130, i.e. the lower surface of the movable body 110 and the friction member 130 may generate friction therebetween. The friction between them may stimulate the aromatic particles distributed on a surface of the friction member 130 to emit fragrance to the surrounding environment.

In the mobile communication terminal 100 according to an exemplary embodiment of the present invention, whenever the user slides the movable body 110 to use the mobile communication terminal 100, the friction member 130 may generate friction. Accordingly, the aromatic particles distributed on a surface of the friction member 130 may be stimulated whenever the movable body 110 is moved to continuously emit fragrance.

The surface of the friction member 130 may be scratched or gradually worn out over time. Due to this, the aromatic particles contained in the friction member 130 may be gradually exposed to the surface of the friction member 130. In the mobile communication terminal 100 according to the exemplary embodiment of the present invention, even when almost all the aromatic particles exposed to the surface of the friction member 130 are volatilized, new aromatic particles may be continuously exposed and stimulated due to the friction of the friction member to continuously emit fragrance.

Meanwhile, in the exemplary embodiment of the present invention, the friction member 130 may be attached along the periphery of the keypad 132 of the fixed body 120 because friction may be easily generated at this location in the slide type mobile communication terminal. However, the present invention is not limited thereto. For example, although not shown, portions of the fixed body 120 that are connected to the movable body 110 (for example, parts that operate during the sliding operation of the movable body 110) contact each other as the movable body 110 slides and moves, thereby generating friction. Accordingly, a friction member 130 may be easily used at portions of the fixed body 120 that are connected to the movable body 110.

Figure 3:
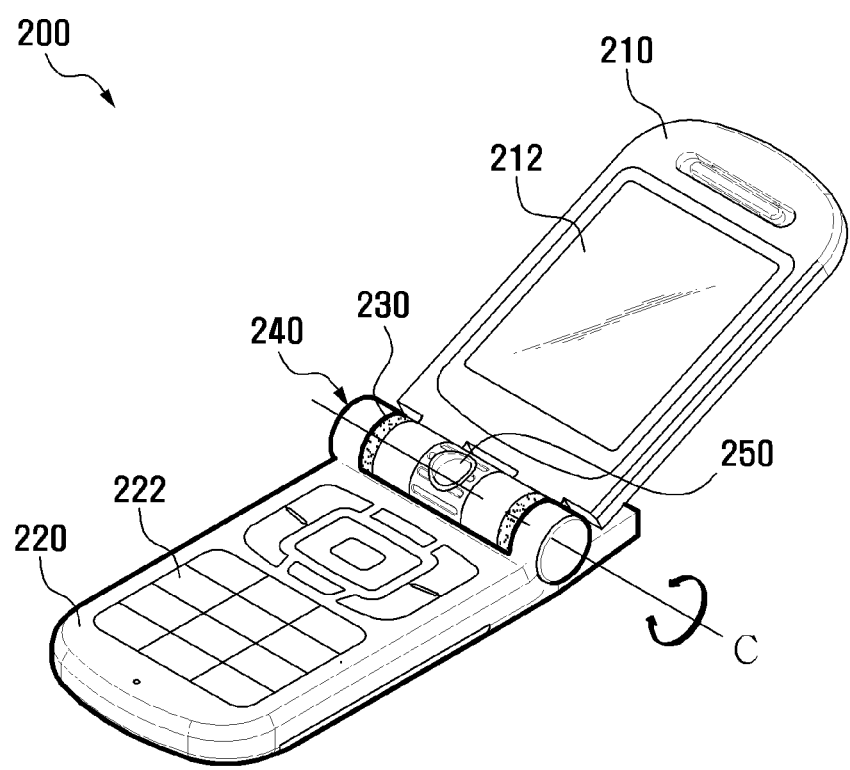
FIG. 3 is a perspective view schematically showing a folder type mobile communication terminal according to another exemplary embodiment of the present invention.

FIG. 3 is a perspective view schematically showing a folder type mobile communication terminal according to another exemplary embodiment of the present invention.

Referring to FIG. 3, the folder type mobile communication terminal 200 according to the exemplary embodiment of the present invention includes a fixed body 220, a rotatable body 210, and a hinge module 240.

The rotatable body 210 includes a display 212 on one surface thereof. In this case, since the display 212 has a similar structure to that of the above-mentioned slide type mobile communication terminal 100 (refer to FIG. 1), a detailed description thereof will be omitted. The rotatable body 210 is connected to the fixed body 220 (described below) through the hinge module 240, and may be rotated away from or toward the fixed body 220 with the hinge module 240 functioning as a rotary shaft by user manipulation.

The fixed body 220 includes a keypad 222, and a first end of the fixed body 220 is connected to the rotatable body 210 through the hinge module 240.

The first end of the fixed body 220 and a first end of the rotatable body 210 are engaged with each other through the hinge module 240, and the rotatable body 210 may be rotated with the hinge module 240 functioning as a rotary shaft C.

The hinge module 240 includes a friction member 230. The friction member 230 is attached to a portion of the hinge module 240 where friction is generated when the rotatable body 210 rotates. In this exemplary embodiment of the present invention, as shown in FIG. 3, the friction member 230 is attached to a portion of the hinge module 240 that rotates when the rotatable body 210 rotates. Accordingly, when the rotatable body 210 rotates with respect to the fixed body 220, the friction member 230 of the hinge module 240 contacts a portion of the hinge module 240, thereby generating friction. However, the present invention is not limited thereto, and friction members 230 may be included everywhere that the rotatable body 210 contacts the fixed body 220 to generate friction.

The friction member 230 is a fragrance member that emits fragrance, and may be formed by mixing a synthetic resin with an aromatic as in the aforementioned exemplary embodiment of the present invention. In other words, the friction member 230 may be formed by mixing polyacetal with an aromatic and then performing an injection molding process.

The operation of the folder type mobile communication terminal 200 is similar to that of the aforementioned slide type mobile communication terminal. In other words, as the user rotates the rotatable body 210, friction may be generated between the friction member 230 and other elements contacting the friction member 230. The friction stimulates the aromatic particles distributed on a surface of the friction member 230 so that the friction member 230 emits fragrance to the surrounding environment.

In the folder type mobile communication terminal 200 according to this exemplary embodiment of the present invention, whenever the user rotates the rotatable body 210 to use the mobile communication terminal 200, the friction member 230 may generate friction. Accordingly, the aromatic particles distributed on a surface of the friction member 230 are repetitively stimulated to continuously emit fragrance.

As in the aforementioned exemplary embodiment of the present invention, the surface of the friction member 130 may scratched or gradually worn out over time. Due to this, the aromatic particles contained in the friction member 230 may be gradually exposed to the surface of the friction member 230. In the mobile communication terminal 200 according to this exemplary embodiment of the present invention, even when almost all the aromatic particles exposed to the surface of the friction member 230 are volatilized, new aromatic particles may be continuously exposed and stimulated due to the friction of the friction member to continuously emit fragrance.

FIG. 3 shows the friction member 230 attached to the hinge module 240. However, the present invention is not limited thereto. In other words, the friction member 230 may be attached to any location where friction is generated. For example, as shown in FIG. 3, when a rotatable camera 250 is used, friction is generated as the camera 250 rotates. Here, a friction member could be disposed between the camera 250 and a surface it contacts such that fragrance may be emitted whenever the user moves the camera 250.

As mentioned above, in the mobile communication terminals according to the exemplary embodiments of the present invention, friction members to emit fragrance are attached to locations where friction is generated. Accordingly, aromatic particles may be stimulated by the user's manipulation of the mobile communication terminals for communication, thereby emitting fragrance. In addition, the aromatic particles contained in the friction members may be exposed to surfaces of the friction members by friction of the friction members, thereby continuously emitting fragrance.

Although a slide type mobile communication terminal and a folder type mobile communication terminal have been described as exemplary embodiments of the present invention, the present invention is not limited thereto, and mobile communication terminals having various structures may be applied to the present invention.

Furthermore, in the exemplary embodiments of the present invention, although the friction members are attached to a portion of the fixed body that contacts the movable body or the hinge module, the present invention is not limited thereto. In other words, the friction members may be applied to any locations where friction is generated. For example, a friction member may be formed at a location where an earphone jack is inserted or a USB connector is connected so that fragrance may be emitted whenever the earphone jack or the connector is inserted. Further, the friction members can be disposed on the movable body instead of the fixed body. In addition, although mobile communication terminals having fragrance members have been exemplified, the present invention may be applied all electronic appliances that can generate mechanical friction during the use of the electronic appliances for their general purposes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
   a fragrance member, the fragrance member comprising a synthetic resin and an aromatic;
   a fixed body comprising an upper surface where a key pad is provided; and
   a movable body comprising an upper surface where a display is provided and a lower surface opposite the upper surface, the lower surface of the movable body being slidably connected to the upper surface of the fixed body,
   wherein the fragrance member is disposed on the upper surface of the fixed body to generate friction between the lower surface of the movable body and the fragrance member in response to the movable body sliding.

2. The mobile communication terminal of claim 1, wherein the synthetic resin is polyacetal (POM).

3. The mobile communication terminal of claim 2, wherein the fragrance member comprises 3 to 7 wt. % of the aromatic.

4. The mobile communication terminal of claim 2, wherein the fragrance member is formed by mixing polyacetal and the aromatic, melting the mixture, and performing an injection molding.

5. The mobile communication terminal of claim 4, wherein the fragrance member is injection-molded at a temperature of 170 to 200 degrees Celsius.

6. The mobile communication terminal of claim 1, wherein the fragrance member is disposed along the periphery of the keypad.

7. The mobile communication terminal of claim 1, wherein the fragrance is disposed at a location where the movable body and the fixed body are connected to each other.

8. The mobile communication terminal of claim 1, wherein a surface of the fragrance member is abraded by the generated friction in response to the movable body sliding.

9. A mobile communication terminal, comprising:
  a fragrance member, the fragrance member comprising a synthetic resin and an aromatic;
  a fixed body;
  a rotatable body; and
  a hinge module comprising a first cylindrical portion extending from the fixed body and a second cylindrical portion extending from the rotatable body to be rotatably coupled with the first cylindrical portion,
  wherein the fragrance member is disposed between the first and second cylindrical portions to generate friction on the fragrance member in response to the rotatable body rotating.

10. The mobile communication terminal of claim 9, wherein the synthetic resin is polyacetal (POM).

11. The mobile communication terminal of claim 9, wherein the fragrance member comprises 3 to 7 wt. % of the aromatic.

12. The mobile communication terminal of claim 9, wherein the fragrance member is formed by mixing polyacetal and the aromatic, melting the mixture, and performing an injection molding.

13. The mobile communication terminal of claim 12, wherein the fragrance member is injection-molded at a temperature of 170 to 200 degrees Celsius.

14. The mobile communication terminal of claim 9, further comprising a movable camera, wherein the fragrance member is disposed at a position where friction is generated when the camera moves.

15. The mobile communication terminal of claim 9, wherein a surface of the fragrance member is abraded by the generated friction in response to the rotatable body rotating.

16. A mobile communication terminal, comprising:
  a fragrance member, the fragrance member comprising a synthetic resin and an aromatic;
  a fixed body;
  a movable body coupled with the fixed body;
  a hinge module comprising a first cylindrical portion extending from the fixed body and a second cylindrical portion extending from the movable body to be rotatably coupled with the first cylindrical portion; and
  a movable camera, wherein the fragrance member is disposed between the second cylindrical portion and the movable camera to generate friction on the fragrance member when the camera moves.

17. The mobile communication terminal of claim 16, wherein the synthetic resin is polyacetal (POM).

18. The mobile communication terminal of claim 16, wherein the fragrance member comprises 3 to 7 wt. % of the aromatic.

* * * * *